United States Patent
Chacko et al.

(10) Patent No.: US 9,941,055 B2
(45) Date of Patent: Apr. 10, 2018

(54) SOLID ELECTROLYTIC CAPACITOR WITH INTERLAYER CROSSLINKING

(71) Applicant: Kemet Electronics Corporation, Simpsonville, SC (US)

(72) Inventors: Antony P Chacko, Simpsonville, SC (US); Danny Yiu Kai Hui, Greenville, SC (US)

(73) Assignee: KEMET Electronics Corporation, Simpsonville, SC (US)

( * ) Notice: Subject to any disclaimer, the term of this patent is extended or adjusted under 35 U.S.C. 154(b) by 176 days.

(21) Appl. No.: 14/743,195

(22) Filed: Jun. 18, 2015

(65) Prior Publication Data

US 2015/0287538 A1 Oct. 8, 2015

Related U.S. Application Data

(63) Continuation-in-part of application No. 13/777,769, filed on Feb. 26, 2013, now Pat. No. 9,312,074.

(60) Provisional application No. 61/603,635, filed on Feb. 27, 2012.

(51) Int. Cl.
| | |
|---|---|
| *H01G 9/15* | (2006.01) |
| *H01G 9/00* | (2006.01) |
| *H01G 9/042* | (2006.01) |
| *H01G 9/028* | (2006.01) |
| *H01G 9/012* | (2006.01) |
| *H01G 9/08* | (2006.01) |

(52) U.S. Cl.
CPC .......... *H01G 9/0036* (2013.01); *H01G 9/012* (2013.01); *H01G 9/028* (2013.01); *H01G 9/0425* (2013.01); *H01G 9/08* (2013.01); *H01G 9/15* (2013.01); *Y10T 29/417* (2015.01)

(58) Field of Classification Search
CPC .......... H01G 9/15; H01G 9/048; H01G 9/012; H01G 9/025; H01G 9/042; H01G 9/145; H01G 9/035; H01G 9/028
See application file for complete search history.

(56) References Cited

U.S. PATENT DOCUMENTS

| | | | |
|---|---|---|---|
| 6,072,694 | A | 6/2000 | Hahn et al. |
| 6,304,427 | B1 | 10/2001 | Reed et al. |
| 6,987,663 | B2 | 1/2006 | Merker et al. |
| 7,099,143 | B1 * | 8/2006 | Fife .................. H01G 9/035 361/503 |

(Continued)

FOREIGN PATENT DOCUMENTS

| | | |
|---|---|---|
| CN | 101091229 | 12/2007 |
| JP | 2002-524868 | 8/2002 |

(Continued)

*Primary Examiner* — Nguyen Ha
(74) *Attorney, Agent, or Firm* — Joseph T. Guy; Patent Filing Specialist, Inc.

(57) ABSTRACT

A method for preparing a solid electrolytic capacitor and an improved solid electrolytic capacitor is provided. The method includes providing an anode, forming a dielectric on the anode, forming a cathode on the dielectric and forming subsequent layers on the cathode wherein the cathode and subsequent layers preferably comprise interlayers. At least one interlayer comprises a monomer, oligomer or polymer with multifunctional or multiple reactive groups and an adjacent layer comprises a molecule with crosslinkable functionality. The oligomer or polymer with multifunctional or multiple reactive groups on one layer react with the crosslinkable functionality in the adjacent layer.

47 Claims, 4 Drawing Sheets

(56) References Cited

U.S. PATENT DOCUMENTS

| | | | |
|---|---|---|---|
| 7,379,290 B2 | 5/2008 | Toida et al. | |
| 7,489,498 B2 | 2/2009 | Izu et al. | |
| 7,929,274 B2 * | 4/2011 | Reed | H01G 4/008 361/528 |
| 2004/0160729 A1 * | 8/2004 | Kochi | H01G 9/025 361/528 |
| 2005/0162815 A1 | 7/2005 | Tseng et al. | |
| 2008/0007893 A1 | 1/2008 | Takagi et al. | |
| 2008/0232029 A1 * | 9/2008 | Ning | H01G 9/035 361/503 |
| 2010/0113709 A1 * | 5/2010 | Kou | B01F 17/005 525/389 |
| 2010/0136222 A1 | 6/2010 | Furukawa et al. | |
| 2010/0214723 A1 * | 8/2010 | Karnik | H01G 9/0032 361/528 |
| 2011/0019339 A1 | 1/2011 | Merker et al. | |
| 2011/0026191 A1 | 2/2011 | Chacko et al. | |
| 2011/0090621 A1 * | 4/2011 | Chacko | H01G 9/012 361/523 |
| 2011/0149477 A1 * | 6/2011 | Summey | H01G 9/0029 361/528 |

FOREIGN PATENT DOCUMENTS

| | | |
|---|---|---|
| JP | 2006-100774 | 4/2006 |
| JP | 2007-086761 | 4/2007 |
| JP | 2008235906 | 10/2008 |
| JP | 2011 082313 | 4/2011 |
| JP | 2012-222345 | 11/2012 |
| WO | WO 2011/014744 | 2/2011 |
| WO | WO 2011/125490 | 10/2011 |

\* cited by examiner ns SOLID ELECTROLYTIC CAPACITOR WITH INTERLAYER CROSSLINKING

CROSS-REFERENCE TO RELATED APPLICATIONS

The present application is a continuation-in-part application of pending U.S. patent application Ser. No. 13/777,769 filed Feb. 26, 2013 which, in turn, claims priority to U.S. Provisional Appl. No. 61/603,635 filed Feb. 27, 2012 both of which are incorporated herein by reference.

BACKGROUND

The present invention is related to an improved polymerization method for preparing solid electrolytic capacitors. More specifically, the present invention is related to an improved method of forming a solid electrolyte capacitor and an improved capacitor formed thereby. Even more specifically, the present invention is related to a capacitor comprising interlayers wherein adjacent interlayers, particularly of the cathode, are cross-linked to each other thereby providing an improved cathode as indicated by improved ESR stability.

The construction and manufacture of solid electrolyte capacitors is well documented. In the construction of a solid electrolytic capacitor a valve metal preferably serves as the anode. The anode body can be either a porous pellet, formed by pressing and sintering a high purity powder, or a foil which is etched to provide an increased anode surface area. An oxide of the valve metal is electrolytically formed to cover up to all of the surfaces of the anode and to serve as the dielectric of the capacitor. The solid cathode electrolyte is typically chosen from a very limited class of materials, to include manganese dioxide or electrically conductive organic materials such as 7,7,8,8 tetracyanoquinonedimethane (TCNQ) complex salt, or intrinsically conductive polymers, such as polyaniline, polypyrol, polythiophene and their derivatives. The solid cathode electrolyte is applied so that it covers all dielectric surfaces and is in direct intimate contact with the dielectric. In addition to the solid electrolyte, the cathodic layer of a solid electrolyte capacitor typically consists of several layers which are external to the anode body. In the case of surface mount constructions these layers typically include: a carbon layer; a cathode conductive layer which may be a layer containing a highly conductive metal, typically silver, bound in a polymer or resin matrix; and a conductive adhesive layer such as silver filled adhesive. The layers including the solid cathode electrolyte, conductive adhesive and layers there between are referred to collectively herein as the cathode layer which typically includes multiple interlayers designed to allow adhesion on one face to the dielectric and on the other face to the cathode lead. A highly conductive metal lead frame is often used as a cathode lead for negative termination. The various layers connect the solid electrolyte to the outside circuit and also serve to protect the dielectric from thermo-mechanical damage that may occur during subsequent processing, board mounting, or customer use.

In the case of conductive polymer cathodes the conductive polymer is typically applied by either chemical oxidation polymerization, electrochemical oxidation polymerization or by dipping, spraying, or printing of pre-polymerized dispersions.

The carbon layer serves as a chemical barrier between the solid electrolyte and the silver layer. Critical properties of the layer include adhesion to the underlying layer, wetting of the underlying layer, uniform coverage, penetration into the underlying layer, bulk conductivity, interfacial resistance, compatibility with the silver layer, buildup, and mechanical properties.

The cathodic conductive layer, which is preferably a silver layer, serves to conduct current from the lead frame to the cathode and around the cathode to the sides not directly connected to the lead frame. The critical characteristics of this layer are high conductivity, adhesive strength to the carbon layer, wetting of the carbon layer, and acceptable mechanical properties.

Today, almost all electronic components are mounted to the surface of circuit boards by means of infra-red (IR) or convection heating of both the board and the components to temperatures sufficient to reflow the solder paste applied between copper pads on the circuit board and the solderable terminations of the surface mount technology (SMT) components. A consequence of surface-mount technology is that each SMT component on the circuit board is exposed to soldering temperatures that commonly dwell above 180° C. for close to a minute, typically exceeding 230° C., and often peaking above 250° C. If the materials used in the construction of capacitors are vulnerable to such high temperatures, it is not unusual to see significant positive shifts in ESR which lead to negative shifts in circuit performance. SMT reflow soldering is a significant driving force behind the need for capacitors having temperature-stable ESR.

Equivalent Series Resistance (ESR) stability of the capacitors requires that the interface between the cathode layer, cathodic conductive layers, conductive adhesive, and leadframe have good mechanical integrity during thermo mechanical stresses. Solid electrolytic capacitors are subject to various thermomechanical stresses during assembly, molding, board mount reflow etc. During board mount the capacitors are subjected to temperatures above 250° C. These elevated temperatures create stresses in the interfaces due to coefficient of thermal expansion (CTE) mismatches between the interfaces. The resultant stress causes mechanical weakening of the interfaces. In some cases this mechanical weakening causes delamination. Any physical separation between the interfaces causes increases in electrical resistance between the interfaces and thus an increased ESR in the finished capacitor.

U.S. Pat. No. 6,304,427, which is incorporated herein by reference, teaches a method for improving ESR stability of capacitors. The combination of materials described therein offers some ESR stability, however, the method still allows an ESR rise of a few milliohms during board mount conditions.

Hahn et al., in U.S. Pat. No. 6,072,694, which is incorporated herein by reference, disclose an electrolytic capacitor whose adhesion of a conducting polymer film to an oxidized porous pellet anode is improved by the incorporation of a silane coupling agent in the polymer impregnating solution, in order to improve leakage and dissipation factor thereof. US Patent Publ. No. 2005/0162815, which is incorporated herein by reference, claims to provide an improved solid electrolytic capacitor by providing a coupling layer between a conducting polymer layer and dielectric layer, capable of bonding to both the conducting polymer layer and dielectric layer by covalent bonding, improving the adhesion and preventing voids from forming there between, thereby improving the electrical performance and reliability of the solid electrolytic capacitor In the capacitor described in U.S. Pat. No. 7,489,498, which is incorporated herein by reference, the conductive adhesive layer and the cathode terminal are connected through the organic silane layer, as a chemical bond between the organic silane layer and the conductive adhesive layer is formed. Inventors claim this enhances the adhesive property of the conductive adhesive layer and the electrode thereby improving ESR.

In U.S. Pat. No. 7,800,887, which is incorporated herein by reference, ESR is improved by forming an intermediate layer containing organic silane on the first electrolyte layer and a step of forming a second electrolyte layer containing a conductive polymer on the intermediate layer.

In US Pat. Publ. No. 2010/0136222, which is incorporated herein by reference, a silane compound is added to the conductive polymer solution. The inventors claim the silane compounds strengthen the binding of a conductive polymer chain by a cross-linking effect.

US Pat. Publ. No. 2011/0026191, which is incorporated herein by reference, teaches a method of improving the ESR stability of capacitors by providing an insulative adhesion enhancing layer with the cathode layers. Although this method gives excellent ESR stability in many solid electrolytic capacitors, this method is not universally applicable for capacitors with various types of dielectric, cathode materials, and assembly process.

In U.S. Pat. No. 6,987,663, which is incorporated herein by reference, a polymeric cathode outer layer is generated by applying a dispersion comprising particles of a conductive polymer, such as polyethylene dioxythiophene:polystyrene sulfonic acid (PEDT:PSSA) and a binder. However, this method has the drawback that the ESR rises markedly under a thermal load, such as is produced for example during soldering of the capacitors. In US Patent Publ. No. US 2011/0019339, which is incorporated herein by reference, the inventors claim that ESR stability can be improved by applying a polymeric intermediate layer between the solid electrolyte and polymeric outer layer by means of dispersions comprising particles of a conductive polypyrrole and/ or polyaniline and/or polythiophene, in particular of a conductive polythiophene, having an average particle diameter in the range of 1-60 nm, and a binder.

Solid electrolytic capacitors containing water dispersible conductive polymer dispersion coating such as PEDT:PSSA exhibits an unusually high ESR shift on exposure to SMT conditions. In U.S. Pat. No. 7,379,290, which is incorporated herein by reference, the inventors attribute the ESR instability of PSSA containing conductive polymer dispersion to undoping of PSSA. The inventors have found that undoping of PSSA can be suppressed by adding an additive naphthalene sulfonic acid.

Thus there is a need for a process for solid electrolytic capacitors with improved ESR and ESR stability. A particular need is for capacitor parts to have stable ESR during surface mount temperatures.

SUMMARY OF THE INVENTION

It is an object of the invention to provide an improved solid electrolytic capacitor.

It is an object of the invention to provide an improved method of preparing a solid electrolytic capacitor cathode and an improved solid electrolytic capacitor formed thereby.

Another object of the invention is to improve ESR stability of a capacitor by interlayer crosslinking of various layers in the capacitor.

Another object of the invention is to prepare cathode layers containing a reactive binder or a crosslinker.

Another object of the invention is to prepare cathode layers containing a binder with reactive functionality.

Another object of the invention is to prepare cathode layers containing a crosslinker which can crosslink with the reactive binder in an adjacent layer.

Another object of the invention is to prepare cathode layers containing a binder with multiple reactive functionality which can react with adjacent layers containing a binder with reactive multiple functionality.

A particular advantage is provided by improving ESR stability on exposure to SMT reflow conditions.

These and other advantages, as will be realized, are provided in a method for preparing a solid electrolytic capacitor. The method includes:
providing an anode;
forming a dielectric on the anode;
forming a cathode on the dielectric wherein the cathode comprises interlayers and at least one interlayer comprises a monomer, oligomer or polymer with multifunctional or multiple reactive groups and an adjacent layer comprises a molecule with crosslinkable functionality; and
wherein the oligomer or polymer with multifunctional or multiple reactive groups on one layer react with the crosslinkable functionality in said adjacent layer.

Yet another advantage is provided in a capacitor with an anode and a dielectric on the anode. A cathode is on the dielectric wherein the cathode comprises interlayers wherein at least one interlayer comprises a monomer, oligomer or polymer with multifunctional or multiple groups and an adjacent interlayer comprises a molecule with cross-linked to the multifunctional or multiple groups.

Yet another embodiment is provided in a method for preparing a solid electrolytic capacitor. The method includes: providing an anode; forming a dielectric on the anode; forming a cathode on the dielectric wherein the cathode comprises a metal containing layer; forming a protective coating on the metal containing layer wherein the protective layer comprises a monomer, oligomer or polymer with multifunctional or multiple reactive groups and an adjacent layer comprises a molecule with crosslinkable functionality; and the oligomer or polymer with multifunctional or multiple reactive groups on one layer react with the crosslinkable functionality in the adjacent layer.

Yet another embodiment is provided in a capacitor comprising an anode and a dielectric on the anode. A cathode is on the dielectric and a protective coating is on the cathode. At least one of said cathode or said protective coating comprises a monomer, oligomer or polymer with multifunctional or multiple groups and an adjacent layer comprises a molecule with cross-linked to said multifunctional or multiple groups

FIGURES

DESCRIPTION

The instant invention is specific to a method of making a solid electrolytic capacitor and a solid electrolytic capacitor with interlayer crosslinking between adjacent layers of the capacitor and specifically interlayer crosslinking between adjacent cathode interlayers and/or protective layers. More specifically, the instant invention is specific to a solid electrolytic capacitor with improved ESR achieved by the use of interlayer crosslinking between various layers of the capacitor specifically interlayer crosslinking between various cathode interlayers.

The invention will be described with reference to the various figures which form an integral non-limiting component of the disclosure. Throughout the disclosure similar elements will be numbered accordingly.

Figure 1:
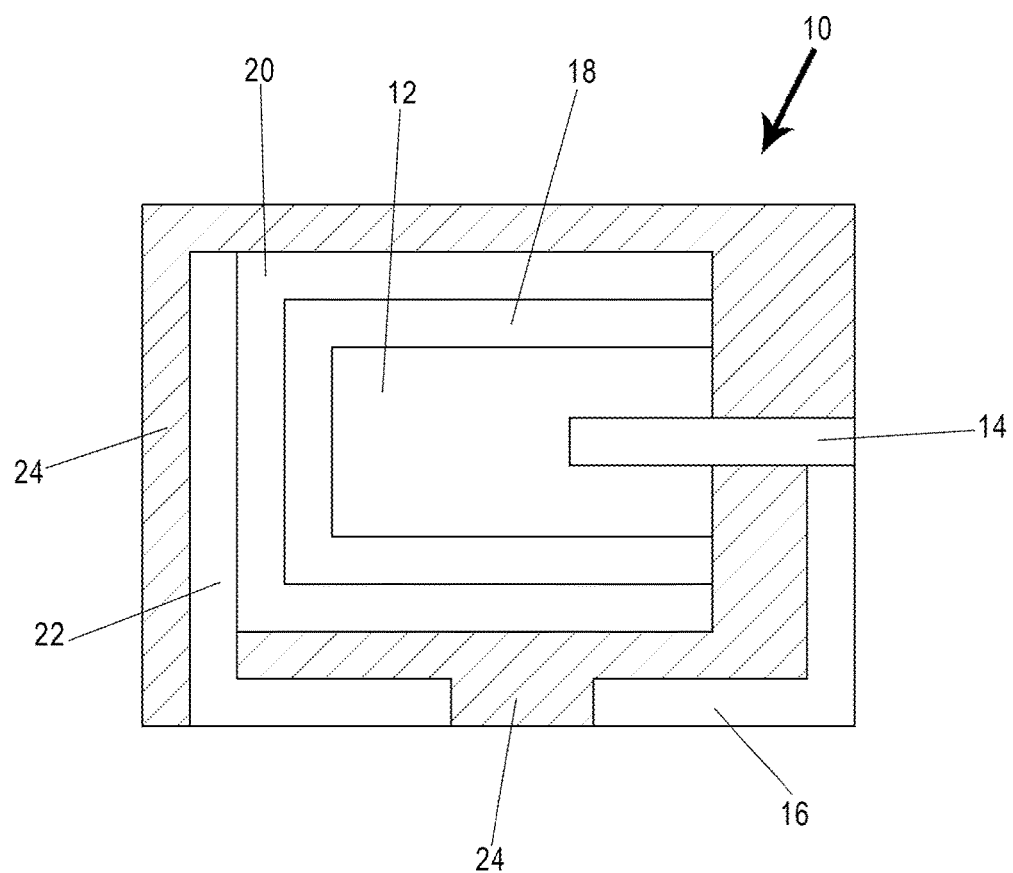
FIG. 1 is a schematic cross-sectional view of an embodiment of the invention.

An embodiment of the invention is illustrated in cross-sectional schematic side view in FIG. 1. In FIG. 1, a capacitor, generally represented at 10, comprises an anode, 12, with an anode lead wire, 14, extending therefrom or attached thereto. The anode lead wire is preferably in electrical contact with an anode lead, 16. A dielectric, 18, is formed on the anode and preferably the dielectric encases at least a portion, and preferably the entire, anode. A cathode, 20, is on the dielectric and encases a portion of the dielectric with the proviso that the cathode and anode are not in direct electrical contact. A cathode lead, 22, is in electrical contact with the cathode. In many embodiments it is preferred to encase the capacitor in a non-conductive resin, 24, with at least a portion of the anode lead and cathode lead exposed for attachment to a circuit board as would be readily understood by one of skill in the art. The cathode preferably comprises multiple interlayers which are preferably cross-linked to each other as will be more fully described herein.

Figure 2:
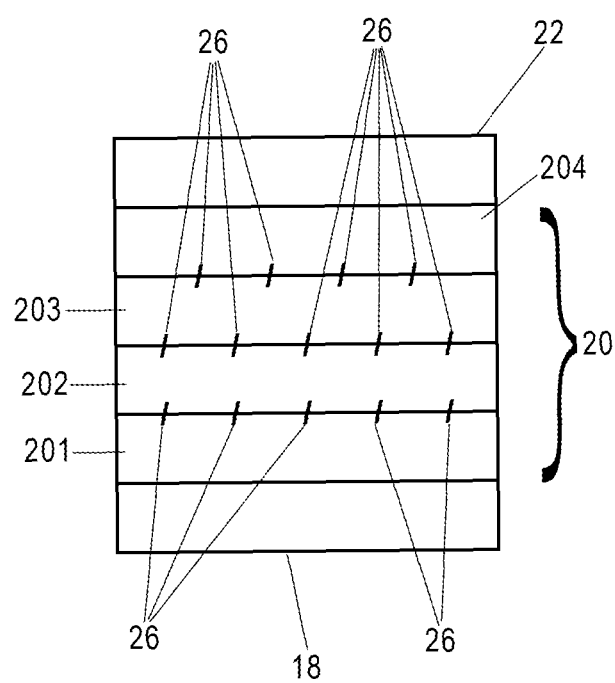
FIG. 2 is a schematic partial cross-sectional view of an embodiment of the invention.

An embodiment of the invention is illustrated in partial cross-sectional schematic view in FIG. 2. In FIG. 2, the cathode, 20, comprises multiple interlayers, 201-204, which are illustrated schematically, wherein the cathode is formed on the dielectric, 18. Cross-linkable functionality in adjacent interlayers are caused to react to form a covalent linkage, 26, between adjacent interlayers which is referred to in the art as cross-linking or cross-linked layers. While not limited thereto the cathode interlayers are preferably selected from layers of conductive polymer, carbon containing layers and metal containing layers most preferably in sequential order. In a particularly preferred embodiment a first interlayer, 201, is at least one conductive polymer layer formed either by in-situ polymerization or by repeated dipping in a slurry of conductive polymer with at least partial drying between dips. It is well understood that soldering a lead frame, or external termination, to a polymeric cathode is difficult. It has therefore become standard in the art to provide conductive interlayers which allow solder adhesion. A second interlayer, 202, which is preferably at least one carbon interlayer, is typically applied to the conductive polymer interlayer, 201. The carbon interlayer, or series of carbon interlayers, provides adhesion to the conductive polymer interlayer and provides a layer upon which a third interlayer, which is preferably at least one metal containing interlayer, 203, will adequately adhere. Particularly preferred metal containing interlayers comprise silver, copper or nickel. The metal interlayer is a solderable layer thereby allowing external terminations, such as a cathode lead, 22, to be attached to the cathodic side of the capacitor such as by solder or an adhesive interlayer, 204. In a particularly preferred embodiment crosslinking with or within the cathode occurs between at least one of: a conductive polymer interlayer and a carbon interlayer; a carbon interlayer and a metal interlayer; a metal interlayer and an adjacent layer opposite said carbon interlayer.

Figure 4:
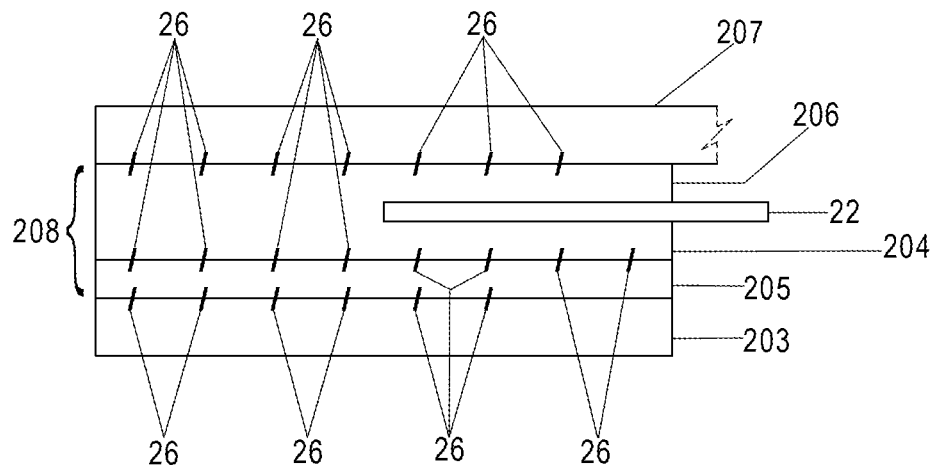
FIG. 4 is a schematic partial cross-sectional view of an embodiment of the invention.

An embodiment of the invention is illustrated in partial cross-sectional schematic view in FIG. 4. In FIG. 4, a metal containing interlayer, 203, has coated thereon a protective coating, 208, which comprises at least one of a first protective coating, 205, or a second protective coating, 206. The first protective coating, 205, which may be a single layer, or may comprise interlayers, covers at least a portion of the metal containing layer and preferable encases the metal containing layer with at least a portion of the first protective coating being between the conductive adhesive, 204, and metal containing layer, 203. The second protective coating, 206, encases the metal containing layer and first protective coating, if present, and the conductive adhesive, 204. In one embodiment the metal containing layer and protective coating are crosslinked by a covalent linkage, 26, between the adjacent interlayers of the protective coating, which may be the first protective coating, and the metal containing layer. The adhesive interlayer, 204, adheres the cathode lead, 22, to either the metal containing layer or the first protective coating, if present. In a preferred embodiment the adhesive interlayer is crosslinked to the first protective coating by a covalent linkage, 26. When both the first protective coating and second protective coating are present it is preferable that the second protective coating be crosslinked to the first protective coating by a covalent linkage, 26. An encapsulating layer, 207, is on the protective coating wherein the encapsulating layer and protective coating, or second protect coating of the protective coating, are crosslinked by a covalent linkage, 26. When the second protective coating is not present the encapsulating layer, 207, is on the first protective coating, 205, and the cathode lead, 22, and preferably the encapsulating layer is crosslinked to the first protective coating by a covalent linkage, 26.

Figure 3:
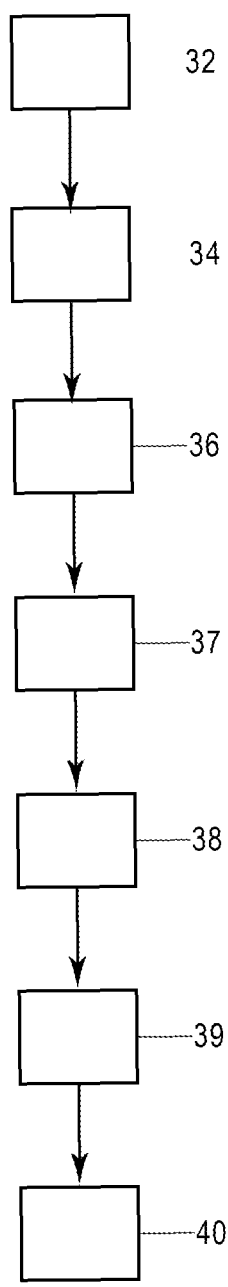
FIG. 3 is a flow chart representation of an embodiment of the invention.

An embodiment of the invention is illustrated in flow chart form in FIG. 3. In FIG. 3, the method of forming a solid electrolytic capacitor of the instant invention is illustrated. In FIG. 3, an anode is provided at 32. A dielectric is formed on the surface of the anode at 34 with a particularly preferred dielectric being an oxide of the anode. A cathode layer is formed at 36 wherein the cathode comprises multiple interlayers. Interlayers may include at least one intrinsically conducting polymer layer; at least one carbon containing layer and at least one metal containing layer. At least one cathode interlayer comprises crosslinkable functionality and an adjacent interlayer comprises multifunctional or multiple reactive groups. In a particularly preferred embodiment a cathode interlayer comprising an intrinsically conductive polymer layer is cross-linked with an interlayer comprising carbon. In another particularly preferred embodiment an interlayer comprising carbon is cross-linked with an interlayer comprising metal. A protective coating is applied to an interlayer comprising metal, at 37, and preferably the protective coating is crosslinked with an adjacent coating selected from either the interlayer comprising metal or a subsequent layer. Anode and cathode leads are attached to the anode and cathode respectively, at 38. An optional, but preferred second application of protective coating is applied to encase the cathode lead and preferably the second protective coating is crosslinked with an adjacent coating selected from either the previously applied protective coating, the metal containing layer, or a subsequent layer. The capacitor is optionally, but preferably, encased at 40 and tested.

Cross-linking adjacent interlayers are formulated to comprise cross-linkable functionality wherein the cross-linkable functionality of one interlayer can be cross-linked with cross-linkable functionality of the adjacent interlayer thereby forming a covalent bond which spans across the boundary of the two adjacent interlayers.

The invention thus provides a process for improved ESR stability by providing a molecule, oligomer, or polymer with crosslinkable functionality in one interlayer and another molecule, oligomer, or polymer with crosslinkable functionality and preferably multifunctional or multiple reactive groups in an adjacent interlayer. Once exposed to curing conditions, which is typically thermal curing, the crosslinkable molecules in adjacent interlayers react with each other thus forming a strongly covalently bound interpenetrating network integral to both adjacent interlayers. Due to this significantly enhanced adhesion, the cathode interlayers resist delamination when exposed to surface mount temperatures.

The interlayer crosslinkable materials preferably comprise two components with one component preferably being a compound, oligomer or polymer with multifunctional or multiple reactive groups. The second component is preferably a molecule with crosslinkable functionality preferably selected from the group consisting of carboxylic, hydroxyl, amine, epoxy, anhydride, isocyanate, imide and amide, carboxyl, carboxylic anhydride, silane, oxazoline, (meth)acrylates, vinyls, maleates, maleimides, itaconates, allyl alcohol esters, dicyclo-pentadiene-based unsaturations, unsaturated $C_{12}$-$C_{22}$ fatty esters or amides, carboxylic acid salts or quaternary ammonium salts.

In one embodiment the invention includes a solid electrolytic capacitor comprising an interlayer crosslinkable material system where oligomer or polymer comprising multifunctional reactive groups selected from the group consisting of polyester, polyurethane, polyamide, polyamine, polyimide, silicone polyester, hydroxyl functional silicone, hydroxyethyl cellulose, polyvinyl alcohol, phenolic, epoxy, butyral, copolymers of these or mixture of these multifunctional polymers such as epoxy/amine, epoxy/anhydride, isocyanate/amine, isocyanate/alcohol, unsaturated polyesters, vinyl esters, unsaturated polyester and vinyl ester blends, unsaturated polyester/urethane hybrid resins, polyurethane-ureas, reactive dicyclopentadiene resins or reactive polyamides. The oligomer or polymer with multifunctional or multiple reactive groups preferably includes at least one carboxylic acid group and at least one hydroxyl function group. A particularly preferred oligomer or polymer with multifunctional reactive groups is a polyester containing carboxylic and hydroxyl functionality. In addition to oligomers or polymers, particles with surface functional groups can also take aprt in the interlayer crosslinking. Particles with functional groups selected from carboxylic, hydroxyl, amine, epoxy, anhydride, isocyanate, imide, amide, carboxyl, carboxylic anhydride, silane, oxazoline, (meth)acrylates, vinyls, maleates, maleimides, itaconates, allyl alcohol esters, dicyclo-pentadiene-based unsaturations, unsaturated $C_{12}$-$C_{22}$ fatty esters or amides, carboxylic acid salts or quaternary ammonium salts. Particles can be nanoparticles or microparticles. One example of functionalized nanoparticles is organomodified nanoclay.

Polyester comprising carboxylic acid with an acid number of from about 3 to 200 (mg KOH/g resin solids) is a particularly preferred oligomer or polymer with multifunctional reactive groups. More preferable is polyester comprising carboxylic acid with an acid number of from about 3 to 100 (mg KOH/g resin solids) and even more preferably about 20 to 50 or about 50 to 100 (mg KOH/g resin solids)

Polyester comprising carboxylic acid with a hydroxy number of from about 3 to 200 (mg KOH/g resin solids) is a particularly preferred oligomer or polymer with multifunctional reactive groups and even more preferred is a polyester comprising carboxylic acid with a hydroxy number of from about 50 to 100 (mg KOH/g resin solids).

In one embodiment the invention includes a solid electrolytic capacitor comprising polyester where the hydroxy number of the polyester is from about 3 to 100 (mg KOH/g resin solids).

Particularly preferred molecules with crosslinkable functionality includes compounds and polymers comprising melamines, isocyanates, epoxies, hexamethoxymelamines, glyoxals, furfural aldehydes and melamine formaldehyde condensates. The compounds and polymers may further comprise additional crosslinkable functionality. A particularly preferred crosslinker is hexakis (methoyxymethyl) melamine.

In a preferred embodiment at least one interlayer further comprises organic or inorganic particles or fibers with reactive functional groups or carbon particle filled polymer, a metal particle filled polymer and a conductive particle filled polymer or particles of fibers with reactive functional groups or crosslinkable groups.

The anode is a conductor preferably selected from a metal or a conductive metal oxide. More preferably the anode comprises a mixture, alloy or conductive oxide of a valve metal preferably selected from Al, W, Ta, Nb, Ti, Zr and Hf. Most preferably the anode comprises at least one material selected from the group consisting of Al, Ta, Nb and NbO. An anode consisting essentially of Ta is most preferred. Conductive polymeric materials may be employed as an anode material. Particularly preferred conductive polymers include polypyrrole, polyaniline and polythiophene.

The cathode is a conductor preferably comprising at least one of manganese dioxide and a conductive polymeric material. Particularly preferred conductive polymers include intrinsically conductive polymers most preferably selected from polypyrrole, polyaniline and polythiophene. Metals can be employed as a cathode material with valve metals being less preferred. The cathode may include multiple interlayers wherein adhesion layers are employed to improved adhesion between the conductor and the termination. Particularly preferred adhesion interlayers include carbon, silver, copper, or another conductive material in a binder.

The dielectric is a non-conductive layer which is not particularly limited herein. The dielectric may be a metal oxide or a ceramic material. A particularly preferred dielectric is the oxide of a metal anode due to the simplicity of formation and ease of use.

The anode lead wire is chosen to have low resistivity and to be compatible with the anode material. The anode lead wire may be the same as the anode material or a conductive oxide thereof. Particularly preferred anode lead wires include Ta, Nb and NbO. The sacrificial lead wire may comprise the same material as the anode lead wire. When electrolyte formation of a dielectric is desired the sacrificial lead wire is preferably highly conductive with low electrical resistivity. The shape of the anode lead wire and sacrificial lead wire is not particularly limiting. Preferred shapes include round, oval, rectangular and combinations thereof. The shape of the anode lead wire is chosen for optimum electrical properties of the ultimate capacitor whereas the shape of the sacrificial lead wire is selected for strength when moving the anode.

The dielectric is preferably formed by dipping the anode into an anodizing solution with electrochemical conversion. Alternatively, a dielectric precursor can be applied by spraying or printing followed by sintering to form the layer. When the dielectric is an oxide of the anode material dipping is a preferred method whereas when the dielectric is a different material, such as a ceramic, a spraying or coating technique is preferred.

The cathode is preferably formed by dipping, coating or spraying either a conductor or a conductive precursor. Conductive precursors are materials which form a conductor after heating or activation.

The first protective coating is a coating with reactive functional groups applied on the metal containing layer. The first protective coating has functional groups which can crosslink with functional groups of the metal containing layer. The first protective coating can also crosslink with the encapsulant or with a second protective coating.

The second protective coating is can be the same composition as the first protective coating and is a coating with reactive functional groups applied. The second protective coating has functional groups capable of crosslinking with the first protective coating or with the encapsulant.

The encapsulant, or molding, encases portions of the capacitor to provide a non-conductive protective layer. Polymers comprising epoxy or phenolic functionality are exemplary materials for protecting the capacitor element from the external environment and to conform to the shape of the capacitor element. The protective coating can crosslink with the epoxy or phenolic functionality of the mold epoxy or encapsulant.

The reaction of the crosslinkable functionality and the crosslinker occurs at elevated temperature which occurs during the normal processing steps of capacitor manufacture.

EXAMPLES

Comparative Example 1

A series of tantalum anodes using two different sets of anodes was prepared. The tantalum was anodized to form a dielectric on the tantalum anode. The anode thus formed was dipped into a solution of iron (III) toluenesulfonate oxidant for 1 minute and sequentially dipped into ethyldioxythiophene monomer for 1 minute. The anodes were washed to remove excess monomer and by-products of the reactions after the completion of 60 minutes polymerization, which formed a thin interlayer of conductive polymer (PEDOT) on the dielectric of the anodes. This process was repeated 6 times. A commercial conductive polymer dispersion (Clevios KV2) was applied 2-4 times to form a thick external polymer interlayer. A prior art graphite coating was applied followed by a silver interlayer. Parts were assembled and ESR before and after surface mount was measured.

Comparative Example 2

Parts were prepared in the same manner as in comparative Example 1 except the conductive polymer dispersion was prepared with a polyester binder. A prior art graphite coating was applied followed by a silver interlayer. Parts were assembled and ESR before and after surface mount was measured.

Example 1

A series of tantalum anodes using two different sets of anodes was prepared. The tantalum was anodized to form a dielectric on the tantalum anode. The anode thus formed was dipped into a solution of iron (III) toluenesulfonate oxidant for 1 minute and sequentially dipped into ethyldioxythiophene monomer for 1 minute. The anodes were washed to remove excess monomer and by-products of the reactions after the completion of 60 minutes polymerization, which formed a thin interlayer of conductive polymer (PEDOT) on the dielectric of the anodes. This process was repeated 6 times. An inventive conductive polymer dispersion containing binder with carboxylic and hydroxy functionality was applied 2-4 times to form a thick external layer. A carbon containing hexamethoxymelamine, as a multi-functional crosslinker, was applied to the polymer layer. A silver layer was applied on both groups. Parts were assembled and ESR before after surface mount was measured.

Example 2

A series of tantalum anodes using two different sets of anodes was prepared. The tantalum was anodized to form a dielectric on the tantalum anode. The anode thus formed was dipped into a solution of iron (III) toluenesulfonate oxidant for 1 minute and sequentially dipped into ethyldioxythiophene monomer for 1 minute. The anodes were washed to remove excess monomer and by-products of the reactions after the completion of 60 minutes polymerization, which formed a thin layer of conductive polymer (PEDOT) on the dielectric of the anodes. This process was repeated 6 times. An inventive conductive polymer dispersion containing binder with carboxylic and hydroxy functionality was applied 2-4 times to form a thick external layer. A carbon layer containing a binder with carboxylic and hydroxyl functionality was applied to the polymer layer. A silver layer was applied on both groups. Parts were assembled and ESR before (QC Final) and after surface mount (SMT) was measured.

|  | QC Final ESR | SMT 5 Pass | ESR Shift |
|---|---|---|---|
| Comparative example 1 | 45.3 | 68.5 | 23.2 |
| Inventive example 1 | 46.27 | 49.89 | 3.62 |
| Inventive example 2 | 49.7 | 56.85 | 7.15 |

|  | QC Final ESR | SMT 5 Pass | ESR Shift |
|---|---|---|---|
| Comparative example 2 | 39.8 | 61.4 | 21.6 |
| Inventive example 2 | 38.9 | 42.25 | 3.35 |

The invention has been described with reference to the preferred embodiments without limit thereto. One of skill in the art would realize additional embodiments and improvements which are not specifically set forth herein but which are within the scope of the invention as more specifically set forth in the claims appended hereto.

The invention claimed is:

1. A method for preparing a solid electrolytic capacitor comprising:
   providing an anode;
   forming a dielectric on said anode;
   forming a cathode on said dielectric wherein said cathode comprises a metal containing layer;
   forming a protective coating on said metal containing layer with said metal layer between said cathode and said protective coating wherein said protective layer comprises a monomer, oligomer or polymer with multifunctional or multiple reactive groups and an adjacent layer wherein said adjacent layer is adjacent to said protective layer comprises a molecule with crosslinkable functionality; and wherein said oligomer or polymer with multifunctional or multiple reactive groups on one layer react with said crosslinkable functionality in said adjacent layer.

2. The method for preparing a solid electrolytic capacitor of claim 1 wherein said adjacent layer is a second metal containing layer.

3. The method for preparing a solid electrolytic capacitor of claim 1 further comprising attaching a cathode lead to a first protective coating of said protective coating.

4. The method for preparing a solid electrolytic capacitor of claim 3 further comprising forming a second protective coating of said protective coating on said cathode lead.

5. The method for preparing a solid electrolytic capacitor of claim 1 wherein said forming a protective coating comprises forming a second protective coating as an adjacent layer to a first protective coating.

6. The method for preparing a solid electrolytic capacitor of claim 5 further comprising crosslinking said second protective coating to said first protective coating.

7. The method for preparing a solid electrolytic capacitor of claim 1 further comprising forming an encapsulating layer as said adjacent layer on said protective coating.

8. The method for preparing a solid electrolytic capacitor of claim 7 further comprising crosslinking said encapsulating layer to said protective coating.

9. The method for preparing a solid electrolytic capacitor of claim 1 wherein said cathode comprises at least one intrinsically conductive polymer layer.

10. The method for preparing a solid electrolytic capacitor of claim 9 wherein said intrinsically conducting polymer is polyethylene dioxythiophene.

11. The method for preparing a solid electrolytic capacitor of claim 1 wherein said cathode comprises at least one carbon containing layer.

12. The method for preparing a solid electrolytic capacitor of claim 1 wherein said metal of said metal containing layer is selected from silver, copper, and nickel.

13. The method for preparing a solid electrolytic capacitor of claim 1 wherein said reactive groups are selected from hydroxyl, carboxylic acid, epoxy, amine, anhydride functional group, polyester, urethane, amide, imide, and epoxy functional molecules.

14. The method for preparing a solid electrolytic capacitor of claim 13 wherein said hydroxy number is from about 50 to 100 (mg KOH/g resin solids).

15. The method for preparing a solid electrolytic capacitor of claim 1 wherein said crosslinkable functionality is selected from the group consisting of carboxylic, hydroxyl, amine, epoxy, anhydride, isocyanate, imide and amide.

16. The method for preparing a solid electrolytic capacitor of claim 1 wherein said crosslinkable functionality includes compounds and polymers comprising melamines, isocyanates, epoxies, hexamethoxymelamines, crosslinkable polyesters, glyoxals, furfural aldehydes and melamine formaldehyde condensates.

17. The method for preparing a solid electrolytic capacitor of claim 16 wherein said molecule with crosslinkable functionality is hexakis (methoyxymethyl) melamine.

18. The method for preparing a solid electrolytic capacitor of claim 1 wherein said oligomer or polymer is a polyester comprising carboxylic acid with an acid number of from about 3 to 100 (mg KOH/g resin solids).

19. The method for preparing a solid electrolytic capacitor of claim 18 wherein said acid number is 20-50 (mg KOH/g resin solids).

20. The method for preparing a solid electrolytic capacitor of claim 18 wherein said acid number is or 50-100 (mg KOH/g resin solids).

21. The method for preparing a solid electrolytic capacitor of claim 18 wherein said oligomer or polymer is a polyester comprising carboxylic acid with an hydroxy number of from about 3 to 200 (mg KOH/g resin solids).

22. The method for preparing a solid electrolytic capacitor of claim 1 wherein said anode comprises a valve metal preferably selected from the group consisting of Al, Ta, Nb and NbO.

23. The method for preparing a solid electrolytic capacitor of claim 1 wherein said cathode layer further comprises organic or inorganic particles of fibers with reactive functional groups.

24. The method for preparing a solid electrolytic capacitor of claim 23 wherein said inorganic particles are selected from nanoparticles, microparticles, functionalized particles, fibers or one interlayer is crosslinked with either functionalized polymer or functionalized particles of an adjacent interlayer.

25. A capacitor made by the method of claim 1.

26. A capacitor comprising:
an anode;
a dielectric on said anode;
a cathode on said dielectric;
a metal containing layer on said cathode;
a protective coating on said metal containing layer; and
wherein said protective coating comprises a monomer, oligomer or polymer with multifunctional or multiple groups and an adjacent layer comprises a molecule with cross-linked to said multifunctional or multiple groups.

27. The capacitor of claim 26 wherein said cathode comprises at least one selected from chemically polymerized intrinsically conducting polymer, electrochemically polymerized intrinsically conducting polymer, and a layer formed from a prepolymerized intrinsically conducting polymer dispersion.

28. The capacitor of claim 26 wherein at least one said cathode or said protective layer further comprises at least one of organic or inorganic particles or fibers with reactive functional groups, carbon particle filled polymer, a metal particle filled polymer, a conductive particle filled polymer, particles of fibers with reactive functional groups or crosslinkable groups.

29. The capacitor of claim 26 where said molecule is selected from the group consisting of polyurethane, polyester, polyamide, polyimide, epoxy, butyral and phenolic.

30. The capacitor of claim 29 wherein said polyester has an acid number of from about 3 to 200 and a hydroxy number of from about 3 to 200.

31. The capacitor of claim 26 wherein the polymer with multifunctional or multiple groups is selected from polyester, polyurethane, polyamide, polyamine, polyamide, polyimide, silicone polyester, hydroxyl functional silicone, hydroxyethyl cellulose, polyvinyl alcohol, phenolic, epoxy, butyral, copolymers.

32. The capacitor of claim 26 wherein said cathode comprises a metal containing layer as said adjacent layer.

33. The capacitor of claim 32 wherein said metal of said metal containing layer is selected from silver, copper, and nickel.

34. The capacitor of claim 26 further comprising a cathode lead attached to a first protective coating of said protective coating.

35. The capacitor of claim 34 further comprising forming a second protective coating of said protective coating on said cathode lead.

36. The capacitor of claim 26 wherein said protective coating comprises a second protective coating as an adjacent layer to a first protective coating.

37. The capacitor of claim 36 wherein said second protective coating is crosslinked to said first protective coating.

38. The capacitor of claim 26 further comprising an encapsulating layer as said adjacent layer.

39. The capacitor of claim 38 further wherein said encapsulating layer is crosslinked to said protective coating.

40. The capacitor of claim 26 wherein said cathode comprises at least one intrinsically conductive polymer layer.

41. The capacitor of claim 40 wherein said intrinsically conducting polymer is polyethylene dioxythiophene.

42. The capacitor of claim 26 wherein said cathode comprises at least one carbon containing layer.

43. The capacitor of claim 26 wherein said reactive groups are selected from hydroxyl, carboxylic acid, epoxy, amine, anhydride functional group, polyester, urethane, amide, imide, and epoxy functional molecules.

44. The capacitor of claim 26 wherein said crosslinkable functionality is selected from the group consisting of carboxylic, hydroxyl, amine, epoxy, anhydride, isocyanate, imide and amide.

45. The capacitor of claim 26 wherein said crosslinkable functionality includes compounds and polymers comprising melamines, isocyanates, epoxies, hexamethoxymelamines, crosslinkable polyesters, glyoxals, furfural aldehydes and melamine formaldehyde condensates.

46. The capacitor of claim 45 wherein said molecule with crosslinkable functionality is hexakis (methoyxymethyl) melamine.

47. The capacitor of claim 26 wherein said anode comprises a valve metal preferably selected from the group consisting of Al, Ta, Nb and NbO.

* * * * *